Feb. 27, 1962          D. D. TAYLOR          3,022,570
VACUUM DEPOSITED STRAIN GAGE AND METHOD OF MAKING SAME
Filed Sept. 21, 1959          2 Sheets-Sheet 1
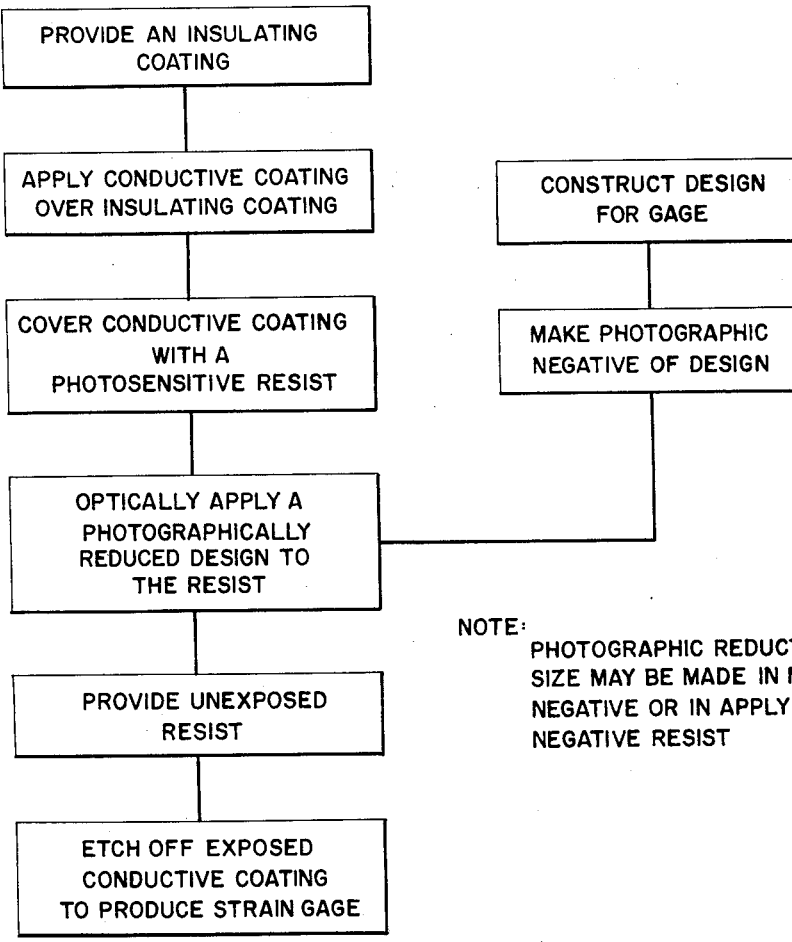
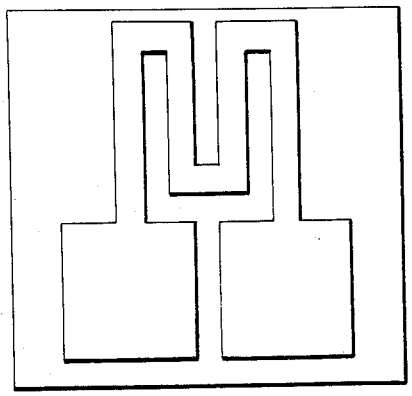
INVENTOR.
DUDLEY D. TAYLOR Feb. 27, 1962     D. D. TAYLOR     3,022,570
VACUUM DEPOSITED STRAIN GAGE AND METHOD OF MAKING SAME
Filed Sept. 21, 1959     2 Sheets-Sheet 2
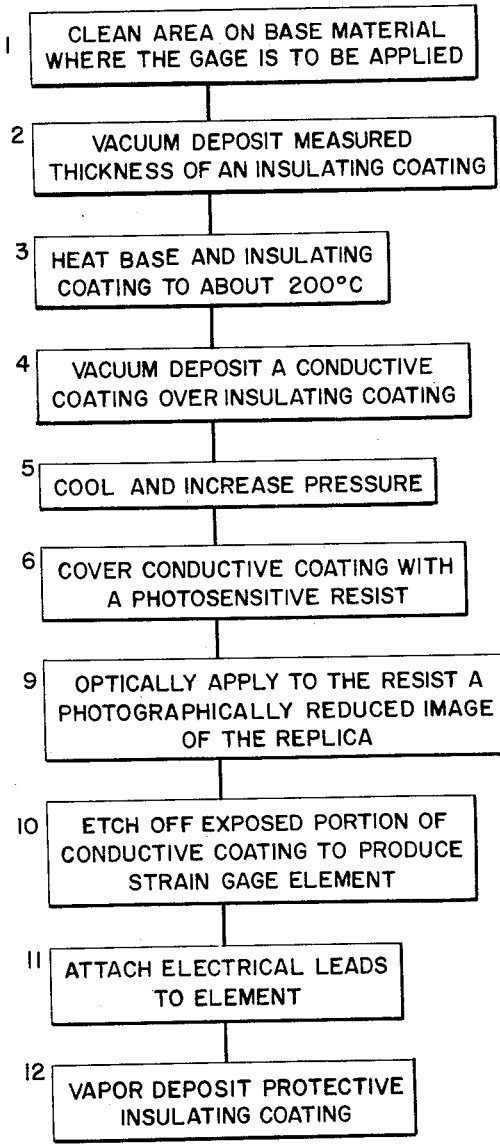
FIG.3.
NOTE:
PHOTOGRAPHIC REDUCTION IN SIZE MAY BE MADE IN MAKING REPLICA OF MODEL OR IN APPLYING IMAGE TO RESIST.
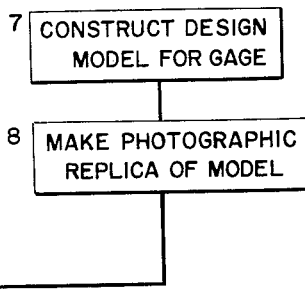
FIG.4.
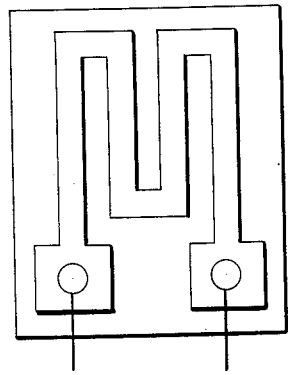
INVENTOR.
DUDLEY D. TAYLOR
BY
ATTORNEYS

United States Patent Office 3,022,570
Patented Feb. 27, 1962

3,022,570
VACUUM DEPOSITED STRAIN GAGE AND
METHOD OF MAKING SAME
Dudley D. Taylor, 11623 35th Place, Beltsville, Md.
Filed Sept. 21, 1959, Ser. No. 841,429
4 Claims. (Cl. 29—155.7)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 668,829 for Vacuum Evaporated Strain Gage, filed June 28, 1957, now Patent No. 2,933,387, issued April 19, 1960.

This invention relates to a vacuum deposited strain gage, and more particularly to a vacuum deposited strain gage of minute size for measuring high frequency strains in small parts under the conditions of high temperatures and a method of making same.

The prior devices of this nature were usually constructed of small wire filaments, as illustrated in the Patent 2,626,338 to Mitchell. The art of making strain gages as films of deposited material is known, but is not generally commercially available. Such film deposited strain gages are taught in the Patent 2,621,276 to Howland.

In the application of strain gages it frequently becomes desirable to measure the strain at closely associated points. Such applications become important where the strain has a very high gradient as well as where the device is of very small dimension itself. It has also been noted that one of the properties of this method of construction of strain gages permits the standardizing of the resistance regardless of the size of the gage. That is to say the gage may initially be designed within relatively large dimensions and be constructed in that form to have a desired resistance for the gage. It may then be constructed in reduced size by the methods of this invention and will be found to have substantially the same resistance in the reduced size as it had in the larger size.

One of the objects of the present invention is to provide a new and improved vacuum deposited strain gage of a minute size and suitable for use at a high temperature.

Another of the objects is to provide a new and improved vacuum deposited strain gage in which the metallic conducting element thereof is vacuum deposited on a coating of vacuum deposited insulating material of non-gassing properties during the vacuum depositing operation and which is bonded by molecular attraction to the strain area to be tested.

Still another object is the provision of a new and improved method for making a vacuum deposited strain gage of minute size and suitable for use at a high temperature.

Still other objects, advantages and improvements will be more clearly apparent from the following description taken in connection with the accompanying drawings of which:

FIG. 1 is a diagram of a method suitable for use with the present invention;

FIG. 2 is a planar view of an example of the gage produced by the present method and drawn to an enlarged scale;

FIG. 3 is a diagram of a further improved method of the present invention; and

FIG. 4 is a planar view of a gage formed by the present method and a pair of electrical leads connected thereto.

Referring now to FIG. 1 in which the steps of the method of the present invention have been diagrammed, it is noted that the first step in this process consists in providing a thin insulating coating. This coating may be generated directly on the object to be tested or may be a separate film of some insulating material suitable for the purpose on which the strain gage is to be formed. In certain applications where high temperatures are involved, it has been found advantageous to apply the insulating coating directly to the object to be tested for the reason that in high temperature applications the insulating material, such as quartz, will stand up better as an insulator under the conditions of service and lend itself readily to the evaporation technique without emitting a gaseous oxide during the evaporation process which would combine with the metal in the vaporous state and thereby render the deposited metallic coating non-uniform in resistivity for the reason that the oxide of the metal possesses a different resistance characteristic than the metal per se. Furthermore, the oxide has a deleterious effect on the bonding characteristic of the evaporated conducting coating. After providing the insulating coating, step 2 provides that a conductive coating of a particular material or alloy metal be applied over the insulating coating or it may be formed as an alloy in place of the material by simultaneously evaporating two metals and depositing them on this surface. These various methods of applying the metallic coating to a surface are suggested in the Patent 2,621,276 to Howland.

After applying the conductive coating, a coating of photosensitive material is applied over the conductive material. This photosensitive resist is then exposed to a pattern for the gage which has been constructed in steps 4 and 5 of FIG. 1, for example, and photographically reduced in size. This exposure to light hardens the resistive material to form a protective coating over the conductive material in the pattern of the desired gage. It should be noted that steps 4 and 5 of the diagram method may be concurrent with the steps 1, 2 and 3 in time.

Since, as disclosed in FIG. 1, it is the negative of the design which is applied to the photosensitive resist, it is possible after the exposure to remove the unexposed resist leaving only the gage design protected by the resist material. After removing the unexposed resist material, the exposed layer of conductive coating is etched away by a suitable etching solution to leave the desired pattern of the strain gage, FIG. 2. It is now possible by using suitable chemicals to remove the hardened portion of the resist from the strain gage pattern to permit the attachment of the necessary lead wires.

In the construction of gages of the type described in the foregoing descriptive matter, it is necessary that the conductive film have a very uniform thickness and be extremely thin to achieve the required resistance in the small dimensions of the gage. Applicant has found that a conductive film of thickness between 5 microinches and 50 microinches has proved satisfactory for this purpose. A conductive coating of less than 5 microinches has been found to be unsuited for the purpose for the reason that it is extremely difficult to vacuum deposit a metallic coating of this thickness and obtain a finished electroconductive element for the strain gage having the property of a predetermined degree of uniform resistivity throughout the effective length thereof without the necessity of individually measuring the resistance of each unit and selecting only those units which meet the predetermined resistance requirements. Should the thickness of the electroconductive coating be less than 5 microinches, the gage will exhibit non-linear strain sensitivity. With regard to the upper limit of substantially 50 microinches in thickness which has been found suitable for the electroconducting element of his strain gage, this thickness should not be exceeded as otherwise the resistance of the minute strain gage disclosed herein would be too low for accurate measurement of small strain values.

These desired results are achieved by the combination of the techniques disclosed herein of vacuum depositing films of the conductive material on a surface of insulating material suitable for the purpose such, for example, as vacuum deposited quartz, and the techniques of photo-etching employed in making printed circuits. Such a combination is desirable because the thickness of the insulating and conducting films deposited by the vacuum depositing methods prevent the formation of any undesirable cracks in the insulating coating under the conditions of service and also prevent any excessive undercutting of the metallic coating when the etched technique is applied. This elimination of undercutting renders it possible and practical to construct these gages in a very small size such, for example, as 1/32 of an inch square.

Referring now to FIG. 3 of the drawings for a more complete understanding of the invention herein disclosed and claimed it will be noted that the first step in the process of making the vacuum deposited strain gage of the present invention is to thoroughly clean the surface on which the film of evaporated quartz is to be applied. This step is of considerable importance for the reason that the adherence of the quartz deposited layer to the surface to be measured for strain depends on the magnitude of inter-molecular attraction. A film of grease or even of occluded gas may prevent the close contact between the evaporated film and the base material necessary for the molecular attraction to produce tight adherence.

The second step is to provide a measured thickness of an insulating coating. This coating must be of uniform thickness and free of defects such as cracks, holes or bubbles. The insulating coating can be applied to the base material by either of two techniques. One of these techniques is to vacuum evaporate a quartz coating directly on to the base material. The other is to bond to the base material with an appropriate adhesive an insulating sheet. Prior to evaporating the conductive metallic strain coating onto the insulating surface and while under vacuum, the surface must be heated to approximately 200° C. or sufficiently to cause diffusion of the alloy constituents as the alloy vapor is deposited on the insulating coating. By increasing the temperature of the surface to be coated, this condition increases the adhesion obtained between the conducting coating and the insulating coating and improves the alloy obtained. When an alloy is to be evaporated the metals may be evaporated simultaneously from separate boats within the vacuum chamber or the alloy of the material can be placed in a single boat and evaporated from this boat. When the evaporation process of this alloy material occurs the constituents of the alloy have different melting and different boiling points which means that the constituents will evaporate from the boat at different rates thus forming on the surface to be coated an imperfect alloy. By heating the base with the insulating coating to the elevated temperature in the vacuum chamber, this condition increases the rate of diffusion of the alloy constituents thus forming again the alloy of the proper percentage of metals. The conducting coating is evaporated on the insulating coating for a period of time until the desired thickness of the conducting coating is obtained. This thickness depends upon the end gage design desired. The thickness of coating can be determined during the vacuum evaporation process by measuring the resistance of the metal alloy as it is being deposited on a separate insulating sheet between two electrodes. When the desired coating thickness is obtained, the evaporation is stopped and the surface which is coated is allowed to cool in the vacuum chamber before the pressure thereagainst is increased. This reduces and eliminates the possibility of oxidizing the surface of the alloy evaporated. Upon removing the base with the coated material thereon from the vacuum chamber, a photosensitive resist is applied to the surface. The elapsed time between removing the evaporated coating from the vacuum chamber and coating with a photosensitive resist should be relatively short to prevent substantial oxidation of the evaporated coating. If the evaporating coating becomes oxidized, the photosensitive resist will not adhere properly to the evaporated surface. Step 7 requires the construction using drafting techniques of a gage having the desired design. The design of this gage will depend on its end use. For example, a gage may be desired which will be primarily intended for the use of measuring strain in one direction or it may be desired to measure the strain in a radial direction such as may occur on a diaphragm, for example. Step 8 requires that a photographic replica be made of the gage design. This replica may be a photographic negative or positive depending upon the particular type of resist used in step 9. Using optical techniques, an image of the gage design is applied to the resist coated strain sensitive alloy of step 9. This process or step causes the exposed or unexposed resist, as the case may be, to harden or soften depending again on the particular type of resist being used. Step 10 calls for the removing of the unwanted exposed portion of the evaporated conducting coating and thus allows the desired pattern or gage design to remain on the insulated coating. Step 11 provides for the attachment of electrical leads to the strain gage such as shown on FIG. 4. These leads depending on the type of use anticipated can be soldered directly to the pattern or they can be attached using metal spraying techniques. When the gage with its electrical leads has been made, a top protective coating indicated in step 12 is applied by vapor deposit on the strain gage. As employed herein, the terms vapor deposit and vacuum deposit may be used interchangeably.

High frequency strain measurements require that, for satisfactory use, the insulating material and/or the bonding adhesives used should possess a high shear modulus. The strain element should also have a very low mass.

To obtain a uniform evaporated coating thickness particular attention must be paid to the geometry of the evaporation setup. For example, a point source of evaporating material will coat a uniform film onto an interior of a sphere and a line source will coat a uniform film onto the interior of a cylinder. However, to coat a uniform film on a flat surface, either the surface must be located far from the point source or the source must be distributed in a plan parallel to the surface to be coated. In the apparatus employed successfully by the inventor a flat dish made of tantulum with an aluminum oxid coating having an area of approximately 25 square centimeters was used. The surface to be coated was placed above the source at a distance of approximately 25 centimeters and had substantially the same area as the source.

As the metal or alloy was being evaporated in vacuo the thickness of the coating was measured by measuring the electrical resistance of the film deposited on a separate glass rod of known length with leads attached to the ends with silver conducting paint and placed near the surface being coated. From this data the thickness of the coating was calculated.

The etching process controls the size of the strain gages which can be made. It was found that conductor paths of .004 inch wide with a spacing of .005 inch could be obtained with a coating thickness of 10 microinches. This means that a standard 120 ohm strain gage would require a conductor path length of less than .01 inch.

The top protective insulating coating serves three purposes: (1) It provides protection of the evaporated coating from scratching and corrosion. (2) It also provides mechanical strength to the electrical leads attached to the strain gages. (3) The top coating also serves as a moisture barrier since any water contacting the strain sensitive film would change the resistivity of the path and render the readings erroneous.

The electrical leads should be attached to the strain sensitive film in such a manner as to reduce any local stress concentration as the result of the lead connections. The transition from the strain sensitive film to the lead wires should be gradual. Any stress concentration in this area would adversely affect the fatigue life of the strain gage.

This method of manufacturing disclosed herein makes possible high resistent strain gages which cannot be obtained by any other known process.

FIG. 4 is generally similar to FIG. 2 and the strain gage shown thereon may be manufactured by the same process as that employed in the manufacture of the device of FIG. 2 or by the method of FIG. 3. FIG. 4, however, shows in addition to FIG. 2 a pair of leads connected thereto for establishing an external electrical connection to the strain gage element, these leads being connected to the ends of the strain gage element as shown in any suitable manner provided the junction of the electrical lead wires to the evaporated conductive film is made in such manner that a stress concentration is not formed thereby.

Briefly stated in summary, the present invention provides a new and improved vacuum deposited strain gage of minute size suitable for measurement of strain of high frequency at an elevated temperature with a high degree of accuracy and which may be made in quantities without testing the resistivity and operational characteristics of this unit by employing the method disclosed herein for producing the same.

While the invention has been described with particular reference to a specific example thereof which gives satisfactory results, it is not so limited as various changes and modifications will be apparent to those skilled in the art, after understanding the invention, without departing from the spirit and scope of the invention and it is intended, therefore, in the appended claims to cover all such changes and modifications.

What is claimed as new and desired to be secured by Letters Patent of the United States is:

1. The method of making a strain gage comprising the steps of cleaning the surface of a base element; vacuum depositing a thin coating of electroinsulating material uniformly on said surface; heating said base element to about 200° C.; vapor depositing a coating of electroconducting alloy on said insulating coating; reducing the temperature of the base element to room temperature, applying a photosensitive resist to said conductive coating before an appreciable amount of oxide has formed thereon; constructing a pattern for said gage and making a photographic replica thereof of reduced size; applying an image of said replica to said resist; etching said conductive coating to remove the excess thereof and leave a strain gage conducting element of the desired pattern on said coating of insulating material; and attaching a pair of electrical leads to said electroconductive coating at the end portions thereof in a manner such that the transition from said coating to said leads is of gradually increasing cross sectional area whereby local stress concentrations are avoided.

2. The method of claim 1 including the additional step of vapor depositing a protective coating of insulating material on said gage and the end portions of said wires connected thereto.

3. The method of making a strain gage of diminutive size comprising cleaning an area on a base element to be strained, vapor depositing a coating of quartz having a uniform thickness of five to one hundred microinches on said surface for intermolecular engagement therewith, heating said base element to about 200° C. and vapor depositing an electroconductive metallic coating of five to one hundred microinches uniformly on said insulating coating, removing the heat from said base element and increasing the pressure thereagainst to room temperature, applying a photosensitive resist to said conductive coating before sufficient time has elapsed for an appreciable amount of oxide to be formed thereon, optically applying an image of miniscule size to said resist to deliniate the desired strain gage element, etching off the exposed portion of the conductive coating to form a strain gage element on said conductive coating of size and configuration corresponding to said image, attaching a pair of electrical leads to the metallic vacuum deposited strain gage element in a manner such that the transition from said coating to said leads is of gradually increasing cross sectional area whereby local stress concentrations are avoided, and applying by vacuum deposition a protective insulating coating of quartz having a thickness of five to one hundred microinches to said strain gage and the end portions of the leads connected thereto.

4. The method of making a strain gage of diminutive size comprising cleaning the surface of an element to be strained, vacuum depositing a predetermined measured thickness of quartz on said surface to provide a thin insulating coating, heating said element to a temperature of about 200° C. and vapor depositing an electrically conductive coating of predetermined thickness to said insulating coating while the insulating coating is heated to said temperature, applying a photosensitive resist to said electroconductive coating when the element has cooled to room temperature and before sufficient time has elapsed for an appreciable amount of oxide to be formed thereon, photographically applying a diminutive image of a gage pattern to said resist, etching off the exposed portion of said conductive coating to produce a strain gage of the size and configuration of said image, attaching a pair of electrical leads to said conductive coating in a manner such that the transition from said coating to said leads is of gradually increasing cross sectional area whereby local stress concentrations are avoided, and thereafter vacuum depositing a thin layer of quartz to said strain gage and the end portions of the leads connected thereto.

References Cited in the file of this patent

UNITED STATES PATENTS

| | | |
|---|---|---|
| 1,655,127 | Beebe | Jan. 3, 1928 |
| 2,435,889 | Kerridge | Feb. 10, 1948 |
| 2,569,714 | Gregory | Oct. 2, 1951 |
| 2,715,666 | Stinchfield | Aug. 16, 1955 |
| 2,933,387 | Taylor | Apr. 19, 1960 |